United States Patent

[11] 3,581,830

[72] Inventor  Thomas A. Stoner
      Brookfield, Wis.
[21] Appl. No  854,871
[22] Filed  Sept. 3, 1969
[45] Patented  June 1, 1971
[73] Assignee  Bucyrus-Erie Company
      South Milwaukee, Wis.

[54] LINEAR FEED CONTROL FOR A ROTARY TOOL
11 Claims, 2 Drawing Figs.

[52] U.S. Cl. ........................................ 173/6,
      173/9
[51] Int. Cl. ...................................... E21b 3/02
[50] Field of Search ........................... 173/6, 7, 9

[56]  References Cited
      UNITED STATES PATENTS
3,247,912  4/1966  Reynolds .................... 173/7
3,373,823  3/1968  Fullerton et al. ........... 173/6

FOREIGN PATENTS
456,447  11/1936  Great Britain ............ 173/6

Primary Examiner—Ernest R. Purser
Attorneys—Thomas O. Kloehn and Arthur H. Seidel ABSTRACT: A blast hole drill has a rotary drive motor, linear drive motor, vibration sensor and control system. The DC rotary drive motor has a Ward-Leonard drive responsive to a speed control potentiometer and a reduced speed control triggered by the vibration sensor. The hydraulic linear drive motor is controlled by a directional and flow control valve responsive to summed tachometer and reference signals with a reduced speed control triggered by the vibration sensor. The control system balances rotary torque and downfeed force to reduce downfeed speed when torque feedback exceeds a predetermined value relative to downfeed feedback.

Fig.1

INVENTOR
THOMAS A. STONER
BY
Thomas O. Kloehn
ATTORNEY

Fig. 2

LINEAR FEED CONTROL FOR A ROTARY TOOL

BACKGROUND OF THE INVENTION

Blast hole drills are used in surface mining to drill holes for explosives. Usually blast holes range in depth from 15 to 60 feet, though blast hole drills have been used to drill holes as deep as 400 feet. Since blast hole drills are used in all types of terrain and frequently must drill through several geological strata having different drilling characteristics, such drills have been manually operated so that the operator could control rotary speed and torque and downfeed rate force to adapt the drill operation to the local terrain and varying drilling conditions. However, as the capabilities and efficiency of drilling equipment have increased, as the demand for blast hole drills has increased and as labor costs have risen, manual operation has become increasingly unsatisfactory.

However, the variables encountered in controlling blast hole drills have been too numerous and unanalyzed to submit to automatic control. The problem of compensating for irregularities and discontinuities in drilling conditions arising in each individual drilling operation has proven particularly troublesome. These discontinuities and irregularities are commonly manifested as vibration in the drill stem, though the precise causes of vibration are frequently unknown and unpredictable. The discovery that these discontinuities and irregularities, whatever the causes, are immediately manifested in an increased torque demand on the rotary drive motor beyond the torque normally required to maintain rotary and downfeed speed for the downfeed force being applied has opened the way for automating drill control.

Since the optimum downfeed rate and the rotary speed of the drill to obtain maximum drilling efficiency depend upon the type of terrain in which the drilling is being done, an adjusting means must be provided to allow both downfeed rate and rotary speed to be adjusted in the field. The maximum downfeed pressure is limited by the design parameters of the equipment, and the maximum rotary drive torque is limited by the current overload specifications of the rotary drive motor armature. Within these limitations, rotary torque and downfeed pressure can be allowed to vary to maintain preset downfeed rate and preset rotary speed.

Throughout the range of varying downfeed pressures, a maximum relative torque can be established for any downfeed pressure for the terrain in which the drill is being used. While the torque may fall well below that maximum relative value, depending upon the nature of the strata being drilled, when the torque demand exceeds the preset maximum value relative to the downfeed pressure, a discontinuity or irregularity in drilling conditions is indicated, requiring a reduction in the downfeed rate command, pending correction of the condition. Typical of such discontinuities in drilling conditions in an uneven shelf or the edge of a large rock, and such conditions will disappear once the area has been penetrated, when normal drilling can be resumed. Hence the control circuit must continually sense the drilling condition to restore the desired preset downfeed rate where possible and to reduce it where necessary to accommodate discontinuous or irregular conditions.

SUMMARY OF THE INVENTION

The present invention relates to a linear feed control for a rotary tool to maintain a desired linear feed rate responsive to varying rotary torque and linear feed pressure conditions; and more specifically, the invention resides in the combination of a rotary tool which is mounted for linear movement, a rotary drive motor which is connected to drive the rotary tool, a linear drive motor which is connected to impart linear motion to the rotary tool, a torque sensor which senses the torque demand on the rotary drive motor and which generates a torque feedback signal proportional to the torque demand, a force sensor which is connected to the linear drive motor to sense the force exerted by the linear drive motor and which generates a linear force feedback signal proportional to the force exerted by the linear drive motor, and a comparator which receives the torque feedback signal and the linear force feedback signal and which originates a command signal when the torque feedback signal exceeds a preset maximum relative to the linear force feedback signal for any value of the linear force feedback signal, the command signal being transmitted to adjust a preset linear speed of said linear drive motor.

The foregoing combination provides a means for automatically accommodating the linear feed of a tool to discontinuities or irregularities in the tool operating conditions so as to maintain the linear feed rate of a rotary tool at the most efficient speed. Such discontinuities or irregularities most often occur in the material on which the tool is working, though the condition of the tool itself cannot be excluded from any complete analysis of the overall tool operating condition. In the automatic operation of blast hole drills, for example, the foregoing combination allows the drill to compensate for vibration as it occurs as a normal part of operation, by the temporary adjustment of the feed rate of the tool so as to approach as closely as possible to the preset feed rate. In the event that the condition causing the vibration of the tool is abnormal and not cured by the automatic operation mentioned, a second safety control may be added to that combination to override the normal controls and qualify the drive of the tool. Such a safety control in a blast hole drill is a vibration sensor that is mounted to detect of the drill adjacent to the drill and to generate a signal proportional to the velocity of that vibration. When the vibration signal exceeds a preset maximum, the safety device reduces rotary speed and linear speed to preset values for a fixed duration of time. After expiration of the reduced speed period, normal speed is resumed. If the vibration persists after rotary speed and linear feed are reduced, then the safety device shuts down the machine and actuates annunciators which signal the malfunction of the machine operator or attendant.

Though the present invention was motivated by the need for an automatic control for a blast hole drill, the invention is believed to have application outside of that field. Generally, the invention relates to the linear feed control, not only for a blast hole drill, but for any type of drill or other rotary tool, Where the linear feed rate of a rotary tool is to be established by an external command and where that linear feed rate may require momentary adjustment to accommodate discontinuities or irregularities in operating conditions, the present invention may have advantageous application.

DESCRIPTION OF THE PREFERRED EMBODIMENT

Figure 1:
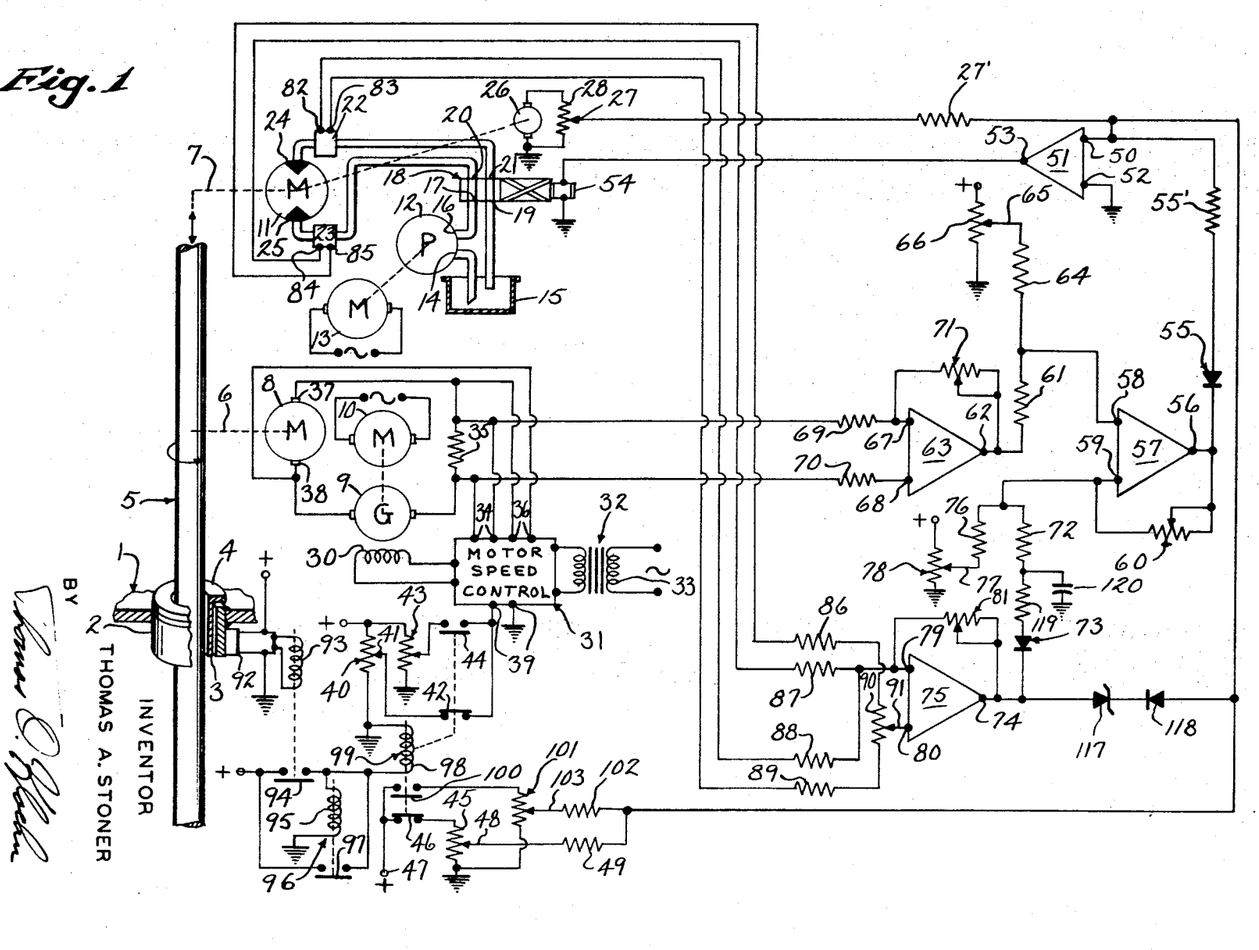
FIG. 1 is a schematic diagram of an embodiment of the present invention.

A blast hole drill is generally mounted on a self-propelled, track-mounted vehicle the size of which generally varies with the diameter of the holes to be drilled. In FIG. 1, the vehicle is represented by a portion of its platform 1 which has a bushing 2 welded in a hole through it. A cylindrical collar 3 with a radial flange 4 on its upper end rests loosely in the bushing 2. A drill stem 5 is rotatably mounted in the collar 3 for linear as well as rotational movement. On the lower end of the stem 5 a drill bit (not shown) of conventional construction is fitted, and the stem 5 with the drill bit (not shown) may be referred to generally as a tool 5. A mechanical transmission 6, represented in the drawing by the broken line 6 is provided for transmitting rotational movement to the tool 5, and linear drive transmission 7, represented by the dotted line 7 is provided to impart linear downfeed (sometimes called "drill") movement to the tool 5, and to retract (or"hoist") the tool 5 from the hole (not shown). The normal rotary speed of the tool 5 in this embodiment can be varied throughout a range of 0 to 100 r.p.m., but usually the tool is operated at 70—80 r.p.m. The equivalent downfeed pressure exerted by the downfeed drive means on the tool 5 will include 100 to 200 p.s.i. from the dead weight of the tool 5 plus 0 to 1,000 p.s.i. applied by the downfeed drive means described below.

The motive power for rotating the tool 5 is provided immediately by a DC electric rotary drive motor 8 which is powered by a Ward-Leonard drive, including a DC generator 9 that is rotated by an AC motor 10, which is connected across an AC source. The linear movement is imparted to the stem 5 by a constant displacement, vane type hydraulic linear drive motor 11, which is powered by a pump 12 that is driven by another AC motor 13 that is also connected across an AC source. The pump 12 has a suction port 14 connected to a reservoir 15 of hydraulic fluid, and a pressure port 16 connected to an input port 17 of an electrical controlled directional and flow control hydraulic valve 18. The valve 18 is a commercially available servo valve and it is a pilot operated four way, spool valve that has an output flow proportional to an electrical input current. A return port 19 of the valve 18 is connected to the reservoir 15. Two output ports 20 and 21 of the valve 18 are connected through respective pressure sensors 22 and 23 to opposite motor ports 24 and 25 of the hydraulic motor 11.

A tachometer 26 is mechanically linked to the hydraulic motor 11. The tachometer 26 generates an electrical signal proportional to the speed of the motor 11. A potentiometer 28 is connected across the terminals of the tachometer 26, one of which is grounded. An electrical linear speed feedback signal proportional to the speed of the motor 11 is taken from a slider 27 on the potentiometer 28. The tachometer 26 and potentiometer 28 make up a linear motor speed feedback signal source.

The armature current for the rotary drive motor 8, which is connected through the rotary drive transmission 6 to rotate the tool 5, is provided by a controllable DC power source, which in this embodiment is a Ward-Leonard drive made up of the generator 9. The armature current output of the generator 9 is controlled through its field 30, which is excited by a motor speed control unit 31. Power for the motor speed control is introduced through a transformer 32, the primary 33 of which is connected to an AC source. A pair of armature current feedback terminals 34 connect the motor speed control 31 across a series resistance 35 in the armature circuit to provide a voltage signal proportional to armature current. Also, a pair of armature voltage feedback terminals 36 connect the motor speed control 31 across terminals 37 and 38 of the armature of the motor 8. One of a pair of reference input terminals 39 is grounded, the two reference input terminals connect the speed control 31 across a speed control potentiometer 40, which also has one end grounded by connecting the other reference input terminal 39 to a sliding end 41 of the speed control potentiometer through a normally closed relay contact 42. The other end of the potentiometer 40 which is opposite the grounded end is connected to a positive DC source in common with one end of a reduce speed potentiometer 43, the other end of which is grounded and the slider of which is connected through a normally open relay contact 44 to the reference input terminal 39. The command signal for the normal speed operation of the tool 5 is provided by the setting of the slider 41 on the speed control potentiometer 40 to the motor speed control unit 31. The motor speed control 31 compares an armature voltage feedback signal on the armature voltage input terminals 36 with a speed control signal on the reference input terminals 39 from the speed control potentiometer 40 to excite the field 30 of the generator 9 so as to maintain the motor 8 at the desired, preset speed.

A source of linear feed reference signals proportional to a preset desired linear feed of the tool 5 is provided by a downfeed speed reference potentiometer 45 that is connected through a normally closed relay contact 46 to a positive terminal 47 of a DC source. The other end of the reference potentiometer 45 is grounded. A slider 48 on the reference potentiometer 45 is connected through a resistor 49 in common with the slider 27 on the tachometer output potentiometer 28. This common connection of the reference potentiometer 45, slider 48 and the linear drive speed feedback potentiometer 28 slider 27 algebraically sums the speed reference signal from the reference potentiometer 45 with a speed feedback signal from the tachometer potentiometer 28 to originate an error signal for controlling the linear feed rate of the tool 5 to maintain the tool 5 at a preset, desired linear feed rate.

This control of the linear feed rate of the tool 5 is accomplished by connecting the common connections of reference potentiometer slider 48 and tachometer potentiometer slider 27 to an input terminal 50 of a servo valve amplifier 51, which has its other input terminal 52 grounded. The servo valve amplifier 51 originates a control signal proportional to the error signal at its output terminal 53 which is connected to an electrical control 54 of the electrically controlled directional and flow control hydraulic valve 18 to actuate the valve 18 which controls the direction and rate of fluid flow to the linear drive motor 11 to control the direction and rate of linear drive of the tool 5.

The input terminal 50 to the servocontrol amplifier 51 to which the common connection of the reference and tachometer potentiometers 45 and 28 is connected is also connected through a blocking diode 55 to an output terminal 56 of a comparator amplifier 57. The comparator amplifier 57 has a torque feedback input terminal 58 and a linear force feedback input terminal 59. A gain control potentiometer 60 is connected from the linear force input terminal 59 to the output terminal 56 of the comparator amplifier 57. In this embodiment, the comparator amplifier 57 is a differential input amplifier, and the linear force input terminal 59 is the inverting input terminal. When the output on the output terminal 56 of the comparator amplifier 57 is negative, the blocking diode 55 will transmit the negative output signal as a command signal to modify the error signal on the input terminal 50 of the servo valve amplifier, but when the output terminal 57 of the comparator amplifier is positive blocking diode 55 blocks it. Hence the combination of the comparator amplifier 57 and the blocking diode 55 serves as a comparator to originate a command signal to the servo valve amplifier 51.

The torque feedback input terminal 58 of the comparator amplifier 57 is connected through a coupling resistor 61 to an output terminal 62 of a torque feedback amplifier 63. Also, the torque feedback input terminal 58 of the comparator amplifier 57 is connected through a drop resistor 64 to a slider 65 on a zero-set potentiometer 66, which is connected across a DC reference source. The torque feedback amplifier 63 has a pair of input terminals 67 and 68 connected through respective coupling resistors 69 and 70 across the armature current feedback resistance 35 which is series connected in the armature circuit of the DC rotary drive motor 8. The torque feedback amplifier 63 is a differential amplifier, and it has a gain control potentiometer 71 connected from its inverting input terminal 67 to its output terminal 62.

The downfeed or linear force input terminal 59 of the comparator amplifier 57 is connected through a coupling resistor 72, a blocking diode 73 and a filter resistor 119 to the output terminal 74 of a linear force feedback amplifier 75. A filter capacitor 120 is connected between coupling resistor 72 and filter resistor 119 to ground. The linear force input terminal 59 of the comparator amplifier 57 is also connected through a drop resistor 76 to a slider 77 of a zero-set potentiometer 78, which is connected across a DC source. The linear force feedback amplifier 75 is a differential amplifier, and it has a inverting input terminal 79 and a noninverting input terminal 80. A gain control potentiometer 81 is connected across the inverting input terminal 79 and the output terminal 74 of the linear force feedback amplifier 75. The input terminals 79 and 80 of the linear force feedback amplifier 75 are connected across the output terminals 82 and 83 and 84 and 85, respectively, of the pressure sensors 22 and 23 through respective coupling resistors 86, 87, 88 and 89. The output terminals 82—85 of the respective pressure sensors 22 and 23 are connected such that pressure signal voltages from pressure sensors 22 and 23 are added in such a way that each of the summation points between resistors 86—89 and 87—88, respectively, have voltages proportional to the pressure difference but of opposite polarities. A balancing potentiometer 90 is connected between the resistors 86—89 with the slider 91 constituting the summation point between the resistors 86—89.

Each of the pressure sensors 22 and 23 contains a diaphragm (not shown) exposed to fluid pressure in the conduits on respective sides of the linear motor 11 between the linear motor 11 and the valve 18. Each of the pressure sensors 22 and 23 also contains an electrical bridge (not shown), at least one leg of which includes a strain gauge (not shown) mounted on the diaphragm. Hence, the bridges will originate a DC signal proportional to the deflections of the diaphragms and thus proportional to the pressure of the hydraulic fluid in the conduits at the ports 24 and 25 of the motor 11. Since feedback signals are taken from both sides of the motor 11, the feedback signals will represent by polarity the direction of linear force, and by signal magnitude the amount of that pressure or force of that feed. The balancing potentiometer 90 is set at the factory to compensate for any differences existing between the pressure sensor 22 and 23. When there is no pressure drop across the hydraulic motor 11, the output signals from the pressure sensors 22 and 23 will cancel each other so that no feedback signal is seen by the linear force feedback amplifier 75. As a pressure drop builds up across the motor 11 during downfeed of the tool 5, a feedback signal is transmitted to the inverting input terminal 79 and noninverting input terminal 80 of the linear force feedback amplifier 75, resulting in a negative linear force feedback signal on the output terminal 74 of the linear force feedback amplifier 75, which feedback signal will be passed by the blocking diode 73 and transmitted to the inverting input terminal 59 of the comparator amplifier 57. If the tool 5 is withdrawn, a negative feedback signal will appear on the inverting input terminal 79 of the linear force feedback amplifier 75 resulting in a positive output signal on the output terminal 74, which positive signal will be blocked by the blocking diode 73. (The positive output signal is usable in portions of the complete control for the blast hole drill which portions are not a part of the present invention and therefore are not disclosed in this application.) Of course, where circumstances of the application are such as to make it more convenient to employ polarities opposite to those disclosed in connection with this particular embodiment, this may be done by making appropriate and well-known modifications in the circuitry. The slider 77 on the zero-set potentiometer 78 has been adjusted at the factory to provide a positive signal proportional to frictional losses in the downfeed mechanism which signal is then algebraically summed with the negative output signal from the linear force feedback amplifier 75 so that the linear force feedback signal seen by the inverting input terminal 59 of the comparator amplifier is proportional to the actual force exerted on the end of the tool 5 at the bottom of the hole.

A vibration sensor 92 is mounted on the bushing 2, and it originates a signal proportional to the velocity of vibrations sensed in the bushing 2, which vibrations may result from vibrations in the tool 5. However, the vibration sensor 92 will indiscriminately detect all vibrations regardless of their source, unlike the above described control system that responds only to drilling conditions. The vibration sensor 92 is energized from a DC source, and its output is connected across a relay coil 93, which actuates a normally opened contact 94 to energize a coil 95 of a timing holding relay 96. The timing relay 96 closes a circuit through contacts 97 from the DC source to a coil 98 of a reduce speed relay 99 and holds the circuit closed for a predetermined period of time. When the coil 98 of the reduce speed relay 99 is energized, it actuates the contacts 42 and 44 connected to the reference input terminal 39 of the motor speed control 31, and the normally closed contact 46 and a normally opened contact 100 to the input terminal 50 of the servo valve amplifier 51. The normally open contact 100 of the reduce speed relay 99 is connected through a reduce feed rate potentiometer 101 and a resistor 102, which is connected to a slider 103 of the reduce speed relay 99 to the input terminal 50 of the servocontrol amplifier 51.

As is evident from the foregoing description and diagram of the vibration sensor circuit, when the reduce speed relay 99 is energized, it disconnects the speed control potentiometer 40 and the downfeed reference potentiometer 45, and substitutes for each the respective reduce speed potentiometers 43 and 101. The reduce speed potentiometers 43 and 101 have the same ranges as the parallel speed control potentiometer 40 and downfeed reference potentiometer 45, but usually the reduce speed potentiometers 43 and 101 are set to command lower speeds. For example, while the speed control potentiometer 40 is usually set to call for 70 to 80 r.p.m. the reduce speed potentiometer 43 is usually set to call for 20—30 r.p.m. in the rotary drive motor 8.

To operate a blast hole drill of this embodiment, a foreman, engineer, or other supervisory personnel, who is familiar with the terrain and the local drilling conditions, will make the initial linear feed rate setting and rotary speed setting for the machine which settings are calculated to produce the most efficient drilling for the particular terrain. He will establish the normal rotary speed for the tool 5 by adjusting the slider 41 on the speed control potentiometer 40, and he will set the optimum linear feed rate for the tool 5 by adjusting the slider 48 on the reference potentiometer 49. At the same time, the foreman or supervisor will set the reduced speed potentiometer 43 and the reduce feed rate potentiometers 45 to which the machine will revert in the event of excessive vibration. He may also set the main control potentiometer 81 on the linear force feedback amplifier 75, or the gain control potentiometer 71 on the torque feedback amplifier 63, or both, to establish the appropriate relationship between torque and downfeed pressure for the terrain in which the drill is operating. For example, in a loose, sandy type of soil a relatively low downfeed pressure may be required for a relatively high torque, whereas in a harder soil where the walls of a hole will not collapse on the tool 5 a greater downfeed pressure relative to the torque may be required. The other potentiometers illustrated in the drawing and discussed previously will be adjusted at the factory to achieve optimum operation of the machine and should require no further adjustment in the field. After the foreman or supervisor has completed the field adjustment for the machine, access to the controls may be closed and locked, and the machine can be turned over to the relatively unskilled operators or attendants.

When the initial penetration, or "collaring" of a new hole is completed and normal drilling begins, the rotary drive motor 8 will accelerate the tool 5 to the preset speed and the motor speed control 31 will hold the tool 5 at that speed. Also, the linear drive motor 11 will drive the tool downward at the desired preset rate. This operation will produce feedback signals to the input terminals 67 and 68 of the torque feedback amplifier 63 and to the input terminals 79 and 80 of the linear force feedback amplifier 75. More specifically, current from the generator 9 to the motor 8 will produce a voltage drop across the resistance 35 in series with the armature of the motor 8 to constitute a feedback voltage proportional to the motor 8 torque on the input terminals 67 and 68 of the torque feedback amplifier 63, and the pressure in the line between the pump 14 and the linear drive motor 11 will cause the pressure sensors 22 and 23, respectively, to transmit feedback signals to the linear force feedback amplifier 75. The tachometer 26, which is mechanically linked to the linear drive motor 11, will generate a signal on the slider 27 of the tachometer potentiometer 28 proportional to the downfeed speed of the tool 5, which signal is summed algebraically with the reference signal from the slider 48 on the reference potentiometer 45 to produce an error signal to the servo valve amplifier 51 to control the flow control and directional control valve 18 so as to maintain the desired, preset linear downfeed speed. The armature voltage feedback signal through the terminals 36 on the motor speed control 31 will be compared with the signal from the slider of the speed control potentiometer 40 so as to excite the field 30 of the generator 9 to produce the necessary armature current to the motor 8 to maintain the desired preset motor speed. The armature current feedback signal to the terminals 34 of the motor speed control 31 serves as a safety feedback to cause the motor to be shut down if an overload develops in the armature of the motor 8.

Current from the generator 9 energizing the rotary drive motor 8 produces a voltage proportional to armature current across the resistance 35, which feedback signal is also proportional to the torque output of the drive motor 8. This feedback signal will appear across the input terminals 67 and 68 of the torque feedback amplifier 63 producing a negative, torque feedback signal on the output terminal 62. The slider 65 on the zero-set potentiometer 63 has been set at the factory so as to provide a signal proportional to frictional losses in the rotary drive mechanism, which signal is algebraically summed with the negative output or torque feedback signal from the torque feedback amplifier 63 so that the torque feedback signal seen by the noninverting input terminal 58 of the comparator amplifier 57 will accurately reflect the actual torque exerted on the tool 5. So long as the torque feedback signal on the noninverting input terminal 58 of the comparator amplifier 57 is less than the linear force feedback signal on the inverting input terminal 59 of the comparator amplifier 57, the output of the comparator amplifier 57 at its output terminal 56 will be positive and will be blocked by the blocking diode 55. With the output of the comparator 57 blocked by the blocking diode 55, the output of the servo valve amplifier 51 will be controlled solely by the algebraic sum of the reference signal from the reference potentiometer 45 and the feedback signal from the slider 27 of the tachometer potentiometer 28, which is the error signal.

However, when the torque demand of the tool 5 produces a feedback signal on the noninverting input terminal 58 of the comparator amplifier 57 that exceeds the linear force feedback signal from the linear force amplifier 75 on the inverting input terminal 59 of the comparator amplifier 57, the output signal on the output terminal 56 of the comparator amplifier 57 will go negative. The negative output signal from the comparator 57 is transmitted by the blocking diode 55 as the command signal to the servo valve amplifier 51. The command signal from the comparator amplifier 57 is algebraically summed with the error signal from the summed tachometer feedback and reference signals to modify the error signal at the input terminal 50 of the servo valve amplifier 51. The modification of the error signal in this embodiment serves to tend to produce a negative signal on the input terminal 50 of the servo valve amplifier 51 resulting in a reducing control signal from the servo valve amplifier 51 to the directional and flow control valve 18 to reduce the linear feed rate of the tool 5 by the hydraulic linear drive motor 11 (reducing the linear feed rate of the tool 5 may include completely reversing the feed rate). As was mentioned in connection with the linear force feedback circuit, in applications where it is convenient to employ polarity the reverse of those disclosed here, this may be done by making the appropriate conversions of elements shown here.

Commonly in blast hole drills it is necessary to penetrate several different geological strata called "shelves," which frequently slope away from horizontal. When the tool 5 strikes a sloping shelf, it initially engages the shelf only at one of its three or more points, while the rest of the tool rotates in the higher stratum. Such an irregularity encountered by a tool 5 causes it to vibrate and such vibrations are manifested as an increased demand for torque, which is sensed by the torque feedback system described in detail above. When the blast hole drill embodying the present invention encounters such a discontinuity or irregularity it will penetrate the discontinuity with a rapid series of variations, and sometimes reciprocations, of linear feed rate as the torque demand oscillates with the feed rate until the bit (not shown) of the tool 5 has passed through the shelf or has arrived at a level of relatively regular consistency, eliminating the inordinate torque demand relative to the downfeed pressure applied.

The rapid series of variations or reciprocations in downfeed or linear feed rate of the tool 5 results from the characteristic operation of the invention. First the torque feedback signal transgresses the preset limit relative to the linear force feedback signal, which limit in this instance is a maximum relative value, causing a command signal to be transmitted to the servo valve amplifier 51 to modify the error signal. The servo valve amplifier 51 responds by reducing downfeed rate of the tool 5, resulting in a reduction of the linear or downfeed force feedback signal. The reduction of the linear force feedback signal effectively increases the relative value of the torque feedback signal. This increases the command signal which causes a greater reducing control signal to further reduce the downfeed rate and thus in the downfeed force. As downfeed force continues to decrease, torque demand also decreases, so the torque feedback signal decreases following the decreasing linear force feedback signal. When the decreasing torque feedback signal overtakes the decreasing linear force feedback, the output from the comparator amplifier 57 turns positive again and is blocked by the blocking diode 55. Thus the restoration of a positive output from the comparator amplifier 57 is seen by the servo valve amplifier 51 as a cessation of the command signal, so the error signal is no longer modified but resumes exclusive control. This will be seen by the servo valve amplifier 51 as a demand for accelerated downfeed rate and the servo valve amplifier will transmit an increasing control signal to the directional and flow control valve 18. Downfeed or linear force will then be increased elevating the linear force feedback signal further relative to the torque feedback signal.

The torque feedback signal will remain below the allowable maximum relative to the linear force feedback signal until a discontinuity or irregularity in drilling conditions is again detected, which will occur as soon as downfeed force becomes great enough, if the tool is still encountering the irregular or discontinuous condition. Each time a discontinuity or irregularity in drilling conditions is detected, the cycle described will be repeated. As the tool penetrates a discontinuity or irregularity it will be detected each time increasing downfeed force is applied until penetration is complete, and continuous, regular drilling conditions prevail again. Thus, if downfeed rate or downfeed force is recorded during penetration of a discontinuity, both will be seen to oscillate rapidly as the cyclic operation of the control system recurs again and again.

The control system may be constructed to reverse the feed rate in each cycle before allowing the torque feedback signal to overtake the linear force feedback signal to terminate the command signal. Alternatively, the feed rate may be simply reduced in each cycle. These different modes of operation can be achieved by varying the circuit parameters of the embodiment or by using the embodiment in FIG. 2 described below. In any case the response by a control system of the present invention to a discontinuity or irregularity in drilling conditions is very fast resulting in a maximization of drilling efficiency. Not only does the present invention achieve the optimum downfeed rate for the prevailing conditions and machine characteristics, but it also maximizes the usable life of the tool 5.

Where a condition is set up due either to unanticipated characteristics of the terrain, or a malfunction of the tool 5 such that excessive vibrations in the tool 5 result, these vibrations will be transmitted through the collar 3 to the bushing 2 which is welded to the platform 1. When the velocity of the vibrations in the bushing 2 reach sufficient magnitude, the vibration sensor 92 will cause the coil 93 to be energized, temporarily closing the normally open contact 94. The specific vibration sensor 92 employed in this embodiment responds to vibrations in the range of 0.02 to 2.0 inches per second. Of course, the vibration sensor 92 cannot discriminate as to the source of the vibration, and it will respond to any shock. In that important aspect, the vibration sensor 92 differs from the previously described control system, which responds only to drilling conditions, and which also responds much more quickly than can a vibration sensor, such as the vibration sensor 92.

When the contact 94 is closed, it completes a circuit to a coil 95 of a timing holding relay 96 to energize it. When the timing holding relay 96 energized, its coil 95 closes the normally opened contact 97 for a preset period of time to energize the coil 98 of the reduced speed relay 99 for that period. Meanwhile, the relay coil 93 may be deenergized, dropping out the contact 94. When the reduce speed relay is energized, the normally closed contact 42 connecting the speed control potentiometer 40 to the motor speed control 31 is open and the contact 44 connecting the reduce speed potentiometer 43 to the motor speed control 31 is closed, commanding the motor speed control 31 to reduce the rotary speed of the rotary drive motor 8 to the preset, reduce speed rate. Simultaneously, the normally closed contact 46 connecting DC source through the reference potentiometer 45 to the servo valve amplifier 51 is opened, and the normally open contact 100 connecting the DC source through the reduce feed rate potentiometer 101 to the servo valve amplifier 51 is closed, causing the servo valve amplifier 51 to transmit a reducing control signal to the flow control valve 18 so as to reduce the feed rate of the linear feed motor 11 to the preset level. After expiration of the timing period of the timed holding relay 96, the contact 97 is dropped out, deenergizing the reduce speed relay 99 to restore the rotary drive motor 8 and the linear drive motor 11 to the normal operation. If the excessive vibration in the bushing 2 continues when rotary and linear speeds are reduced, means (not shown) are provided to shut down the operation entirely and actuate annunciators and other warning devices to alert the operator to the condition.

A Zener diode 117 and a blocking diode 118, which are connected in series between the output terminal 74 of the linear force feedback amplifier 75 and the input terminal 50 of the servo valve amplifier 51, serve as a pressure limiter by providing a safety feedback signal when the load on the hydraulic motor 11 becomes excessive. Excessive loading on the linear drive will cause the output terminal 74 of the linear force feedback amplifier 75 to go negative and the Zener diode 117 to conduct driving the input terminal 50 of the servo valve amplifier 51 negative. This reduces or reverses the feed until the condition causing the excessive load on the linear drive is corrected or the feedrate is reduced by the operator.

A filter resistor 119 and a filter capacitor 120 form a low pass filter to ground between the output of the linear force feedback amplifier 75 and the input terminal 59 of the comparitor amplifier 57. The circuit provides a time delay to the linear force feedback system which in the embodiment described in FIGS. 1 and 2 is more rapidly responsive to changes in drilling conditions than the torque feedback system.

Figure 2:
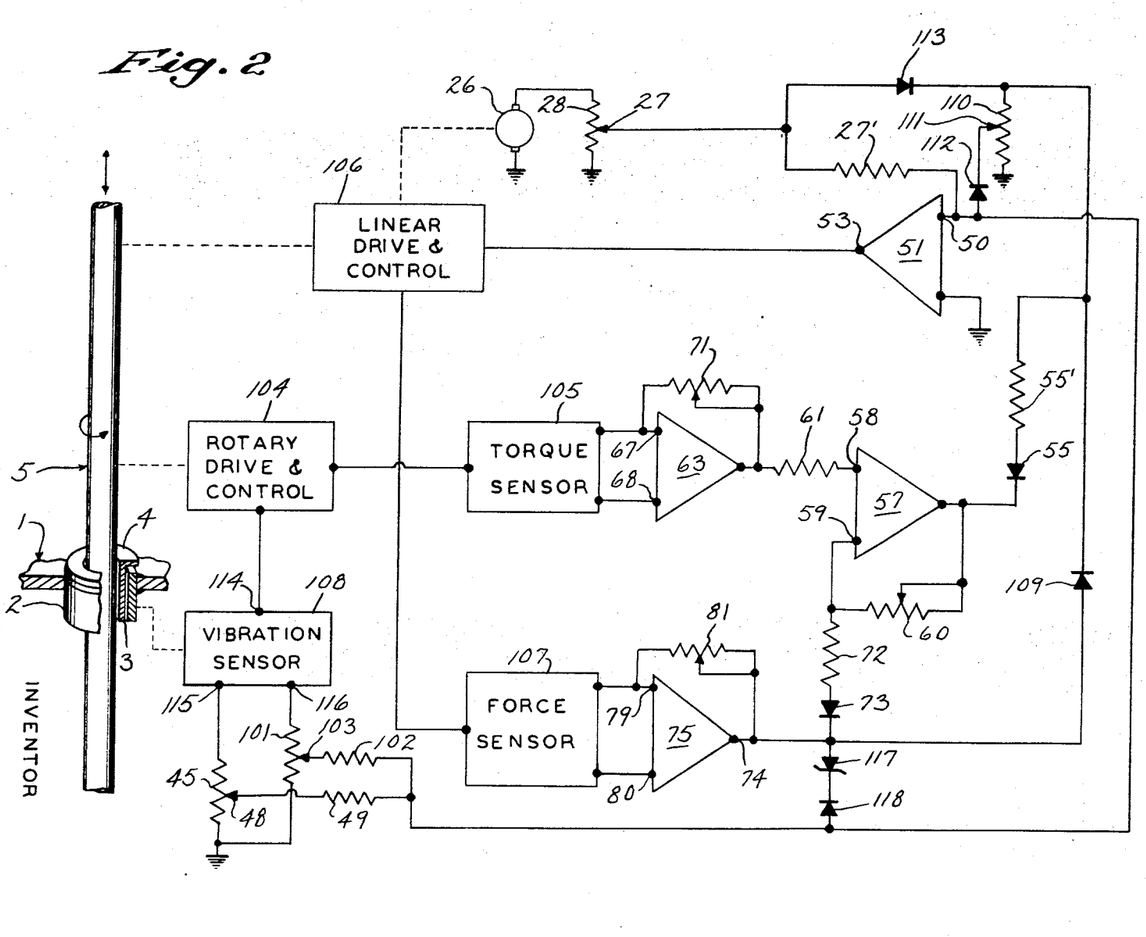
FIG. 2 is a schematic diagram of an alternative embodiment of the present invention.

The embodiment diagrammed in FIG. 2 is an alternative to that shown in FIG. 1. A substantial portion of the structure shown in FIG. 1 may be used in the embodiment of FIG. 2. The stem 5 is rotated by a rotary drive and control 104, such as the Ward-Leonard system shown in FIG. 1. A torque sensor 105 such as the armature current feedback system shown in FIG. 1, is connected to the rotary drive and control 104 and its output is connected to input terminals 67 and 68 of the torque feedback amplifier 63. The output of the torque feedback amplifier 63 is connected through the coupling resistor 61 to the input 58 of the comparator amplifier 57. Linear motion is imparted to the drill system 5 by a linear drive and control 106, such as the hydraulic drive and associated circuitry used in the first embodiment. A force sensor 107 which in a hydraulic drive could be pressure devices like the pressure sensors 22 and 23 used in the first embodiment, is connected to the linear drive and control 106 and develops an output which is connected to input terminals 79 and 80 of the linear force feedback amplifier 75. The output of the linear force feedback amplifier 75 is coupled to the linear force feedback input 59 of comparator amplifier 57 through blocking diode 73, coupling resistor 72 and the filter resistor and capacitor 119 and 120. The output terminal 53 of the servo valve amplifier 51 is connected to the linear drive and control 106. The tachometer 26 is mechanically linked to the linear drive and control 106 and electrically connected to the potentiometer 28. A vibration sensor 108 is linked to the bushing 2 to detect its vibrations, and it has one output terminal 114 connected to the rotary drive and control 104 and two other output terminals 115 and 116 connected to the reference potentiometer 45 and the reduced feedrate potentiometer 101, respectively. The sliders 48 and 103 of reference potentiometer 45 and reduced feedrate potentiometer 101 are both connected to the input terminal 50 of the servo valve amplifier 51 through resistors 49 and 102 respectively.

In addition to the above described structure, which either appears in or has counterparts in FIG. 1, the second embodiment employs additional structure which serves as a clamping circuit. The output of the linear force feedback amplifier 75 is connected through a clamping diode 109 to a potentiometer 110, and the output of the comparitor amplifier 57 is connected to that potentiometer 110 through the blocking diode 55 and the coupling resistor 55′. The other end of the potentiometer 110 is connected to ground. The slider 111 of the potentiometer 110 is connected through blocking diode 112 to the input terminal 50 of the servo valve amplifier 51. The sliding contact 27 of the potentiometer 28 is connected to potentiometer 110 through clamping diode 113 and to the input terminal 50 of the servo valve amplifier 51 through coupling resistor 27′. The output terminal 74 of the linear force feedback amplifier 75 is connected to the input terminal 50 of the servo valve amplifier 51 through Zener diode 117 and blocking diode 118 in series.

This embodiment of the invention differs in operation from that already described for the embodiment of FIG. 1. When a discontinuity is encountered requiring a disproportionate torque demand, the output of the comparator amplifier 57 swings negative and reduces the linear feedrate. During drilling, the slider 27 of potentiometer 28 is at a negative potential directly proportional to speed. The output terminal 74 of the linear force feedback amplifier 75 is at a negative potential directly proportional to downfeed pressure. When the output of the comparitor amplifier 57 swings negative, it is prevented from reversing the linear feed by either the clamping diode 109 or 113. Before the input terminal 50 of the servo valve amplifier 51 is driven below zero by the comparitor amplifier 57 output either clamping diode 109 or 113 will conduct and the high impedance signal from the comparitor amplifier 57 will be overridden by the low impedance speed signal through clamping diode 113 or pressure signal through clamping diode 109. The net effect of this operation is that the linear feed will slow down, but not reverse, when discontinuities or abnormal operating conditions are encountered. Potentiometer 110 adjusts the amount by which the feedrate can be reduced before the clamping action begins. The clamping circuit provides an adjustable means of damping the effect of the error signal produced by abnormal drilling conditions. This circuit provides an electrical means of adjusting the response of the feedback system as the mechanical portions of the drilling apparatus wear. Rapid and large changes in linear feedrate or repeated changes in direction are prevented when such action could damage or wear excessively loose fitting mechanical parts.

A linear feed control for a rotary tool embodying the present invention, such as the downfeed control for the blast hole drill just described, is capable of fully automatic operation in any type of material regardless of the lack of uniformity of the material or other tool operating conditions. The control system responds only to conditions immediately affecting the tool, unlike the vibration meter that responds indiscriminately to shocks and movements from any source. Moreover, the control system is capable of much faster response that has hitherto been possible. The ultimate object of the invention is to effect maximum tool operating efficiency. In terms of blast hole drilling, maximum operating efficiency means drilling the hole as fast as possible without operator control and with a minimum power requirement and wear and tear on the tool and the other machinery. Also the present invention substantially reduces the skill level required of the operator or attendant.

The foregoing sets forth a written description of the invention, and of the manner and process of making and using it, in sufficiently full, clear, concise and exact terms as to enable any person skilled in the art to which it pertains or with which it is most nearly connected, to make and use the same, and, in addition, the foregoing description sets forth the best mode presently contemplated by the inventors for carrying out their invention. By contrast with that written description of the preferred mode carrying out the invention, the specification concludes with the following claims which particularly point out and distinctly claim the subject matter which the applicants regard as their invention.

We claim:

1. A linear feed control for a rotary tool comprising the combination of a tool mounted for rotary movement and for linear movement;

a rotary drive motor connected to transmit said rotary movement to said tool;

a linear drive motor connected to transmit said linear movement to said tool;

a torque sensor connected to said rotary drive motor to sense torque transmitted to said tool and having means to originate a torque feedback signal proportional to said torque;

a linear force sensor connected to said linear drive motor to sense linear force transmitted to said tool and having means to originate a linear force feedback signal proportional to said force;

a comparator connected to receive said torque feedback signal and said linear force feedback signal and having means to originate a command signal when said torque feedback signal exceeds a predetermined limit relative to said linear force feedback signal;

and a linear drive control connected to receive said command signal and to modify said movement transmitted to said tool in response to said command signal.

2. A linear feed control for a rotary tool as set forth in claim 1 wherein said rotary drive motor is a DC electric motor having an armature energized by a DC source;

and said torque sensor includes a resistance in series with said armature circuit of said rotary drive motor to develop a voltage drop proportional to the torque transmitted to said tool and means connected across said resistance to detect said voltage drop and to originate a torque feedback signal proportional to said voltage drop.

3. A linear feed control for a rotary tool as set forth in claim 1 wherein said linear drive motor is a hydraulic motor having fluid ports to receive fluid under pressure to drive said motor;

said linear force sensor includes a pressure sensor connected to at least one of said fluid ports to detect fluid pressure at said port with output terminals to emit electrical signals proportional to said fluid pressure and means connected to said output terminals to receive said electrical signals and to originate a linear force feedback signal proportional to the linear force transmitted to said tool;

and said linear drive control includes an electrically controlled hydraulic valve and means connected to receive said command signal and to originate a control signal responsive to said command signal and to transmit said control signal to said electrically controlled hydraulic valve to control said electrically controlled hydraulic valve.

4. A linear feed control for a rotary tool comprising the combination of a rotary tool mounted for rotary movement and for linear movement;

a rotary drive motor connected to said rotary tool to rotate said rotary tool;

a rotary motor speed control means connected to operate said rotary drive motor at a preset speed;

a linear drive motor connected to said rotary tool to impart said linear movement to said rotary tool;

a linear motor speed control means connected to said linear motor to control the speed of said linear motor responsive to a command signal;

a linear motor speed feedback signal source and a linear speed reference signal source connected to originate a linear speed error signal, and connected to said linear motor speed control to maintain said linear movement at a preset speed;

a torque sensor connected to said rotary drive motor to sense torque demand on said rotary drive motor and to generate a torque feedback signal proportional to said torque demand;

a force sensor connected to said linear force exerted by said linear drive motor and to generate a linear force feedback signal proportional to said force;

and a comparator connected to said torque sensor and said force sensor to receive said torque feedback signal and said linear force feedback signal and to transmit a command signal to said linear motor speed control to modify said error signal to vary said linear motor speed from said present speed when the value of said torque feedback signal relative to said linear force feedback signal transgresses a predetermined limit.

5. A linear feed control for a rotary tool as set forth in claim 4, wherein a clamping circuit is connected to receive said linear motor speed feedback signal and to receive said force feedback signal and connected to said linear motor speed control to limit said command signal preventing said command signal from reversing the direction of said linear motor.

6. A linear feed control for a rotary tool as set forth in claim 4, wherein said rotary tool is a blast hole drill having a stem rotatably and slidably mounted through a bushing in a platform;

said rotary drive motor is connected to a transmission and said transmission transmits rotary drive torque from said rotary drive motor to said stem;

and said linear drive motor is connected to a second transmission and said second transmission transmits linear drive force from said linear drive motor to said stem.

7. A linear feed control for a rotary tool as set forth in claim 4 wherein said linear motor speed control means includes a common connection of said reference signal source and said linear speed feedback signal source algebraically algebraically sum said reference signal and said speed feedback signal to produce said error signal, and means connected to receive said error signal and to transmit a control proportional to said error signal to said linear motor speed control means to control said linear drive speed.

8. A linear feed control for a rotary tool as set forth in claim 7 wherein said linear drive motor is a hydraulic motor having at least one of its ports connected to a hydraulic pump to be powered by fluid pumped by said hydraulic pump;

and said control means is an electrically controlled directional and flow control hydraulic valve connected in series between said hydraulic pump and said linear drive motor.

9. A linear feed control for a rotary tool as set forth in claim 8 wherein said rotary drive motor is a DC motor having an armature energized by a controllable DC power source;

and said rotary speed control means is connected to a speed control potentiometer adjustable to indicate a desired motor speed and across said armature to detect armature voltage to control the output of said DC source to said armature.

10. A linear feed control for a rotary tool as set forth in claim 9 wherein said means connected to receive said error signal is a servo valve amplifier having one input terminal connected to said common connected reference signal source and linear speed feedback signal source, said input terminal also being connected to said comparator to receive said command signal, and having an output terminal connected to said electrically controlled hydraulic valve;

said torque sensor includes a resistance connected in series with said armature of said DC motor and a torque feedback amplifier having input terminals connected across said resistance and an output terminal emitting said torque feedback signal;

said force sensor includes a fluid pressure sensor connected at least to said one port of said hydraulic motor to sense fluid pressure and to originate a fluid pressure signal proportional to said fluid pressure, and a force feedback amplifier having an input terminal connected to receive said signal proportional to fluid pressure and an output terminal transmitting a linear force feedback signal proportional to said fluid pressure signal;

said torque feedback amplifier and said linear force feedback amplifier being adjusted so that said torque feedback signal is normally less than a preset maximum relative to said linear force feedback signal;

and said comparator is a comparator amplifier having input terminals connected to receive said torque feedback signal and said linear force feedback signal and output terminal connected in series with a blocking diode to transmit a command signal only when said torque feedback signal exceeds said maximum.

11. A linear feed control for a rotary tool as set forth in claim 10 wherein said tool is a blast hole drill having a drill stem rotatably and axially slidably mounted in a bushing through a platform;

said linear drive motor is a rotary hydraulic motor;

and said rotary drive DC motor is driving by a Ward-Leonard drive.

PO-1050
(5/69)

UNITED STATES PATENT OFFICE
CERTIFICATE OF CORRECTION

Patent No. 3,581,830            Dated June 1, 1971

Inventor(s) THOMAS A. STONER

It is certified that error appears in the above-identified patent and that said Letters Patent are hereby corrected as shown below:

Col. 2, line 27, after "detect" insert --excessive vibration in the supporting structure--

Col. 3, line 15, change "electrical" to --electrically--

Col. 3, line 52, after "sliding" delete "and the" and insert --contact--

Col. 4, line 22, change "to" to --of--

Col. 4, line 66, "a" second occurrence change to --an--

Col. 9, line 70, change "system" to --stem--

Col. 11, line 47, after "said" insert --linear--

Col. 12, line 34, "present" should be --preset--

Col. 12, line 59, delete "algebraically" first occurrence and insert --to--

Col. 14, line 13 after "and" second occurrence insert --an--

Col. 14, line 22, change "driving" to --driven--

Signed and sealed this 7th day of December 1971.

(SEAL)
Attest:

EDWARD M. FLETCHER, JR.        ROBERT GOTTSCHALK
Attesting Officer                Acting Commissioner of Patents